United States Patent [19]

Akune

[11] 4,285,820
[45] Aug. 25, 1981

[54] PROCESS FOR THE TREATMENT OF A WASTE LIQUID CONTAINING BORON COMPOUNDS AND ORGANIC COMPOUNDS

[75] Inventor: Mikio Akune, Yokosuka, Japan

[73] Assignee: Nittetu Chemical Engineering Ltd., Tokyo, Japan

[21] Appl. No.: 102,558

[22] Filed: Dec. 11, 1979

[30] Foreign Application Priority Data

Dec. 22, 1978 [JP] Japan .................... 53-157607

[51] Int. Cl.³ .................... C02F 1/02; C01B 35/06
[52] U.S. Cl. .................... 210/774; 423/283; 260/462 A; 568/821; 568/837; 55/68
[58] Field of Search ............ 210/63 R, 71, 73 R, 210/56; 423/283, 278; 568/837, 821; 260/462 A, 586 AB; 203/10; 55/68, 72, 74

[56] References Cited

U.S. PATENT DOCUMENTS

| | | | |
|---|---|---|---|
| 3,480,515 | 11/1969 | Goeldner | 203/10 |
| 3,796,761 | 3/1974 | Marcell et al. | 423/283 |
| 4,183,904 | 1/1980 | Meyer | 210/71 |

FOREIGN PATENT DOCUMENTS 851568  8/1977  Belgium .

Primary Examiner—Benoit Castel
Attorney, Agent, or Firm—George A. Loud

[57] ABSTRACT

A process for the treatment of a waste liquid containing boron compounds and organic compounds, such as resulting from the oxidation of paraffins with oxygen in the presence of boron compounds, includes combusting the waste liquid in a furnace at a temperature higher than 1000° C. in the presence of a large amount of steam. The combustion gas may be introduced into a heat recovery zone, preferably a boiler, to recover the heat thereof and then into a contacting vessel to bring same into contact with water and to recover the boron components contained in the gas. Since substantially all the boron components contained in the combustion gas are present in the form of gaseous metaboric acid, there is caused no deposition of boron oxide onto the interior walls of the combustion furnace or gas passages in the boiler.

6 Claims, 1 Drawing Figure

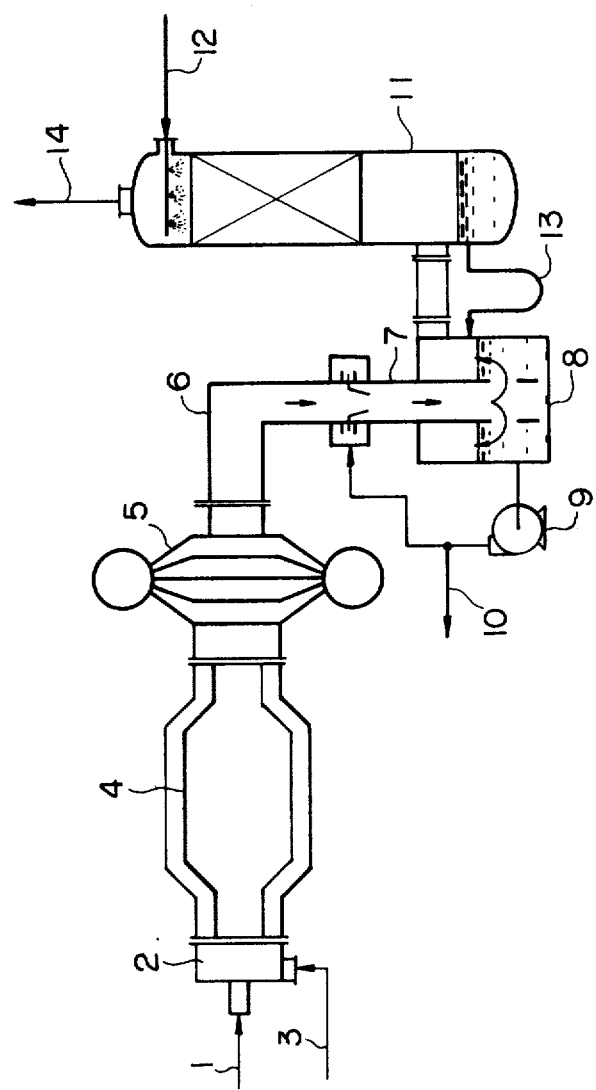

4,285,820

PROCESS FOR THE TREATMENT OF A WASTE LIQUID CONTAINING BORON COMPOUNDS AND ORGANIC COMPOUNDS

BACKGROUND OF THE INVENTION

This invention relates to a process for the treatment of a waste liquid which contains boron compounds and organic compounds and, more particularly, to a process for recovering boric acid from such a waste liquid by the combustion thereof.

Boron compounds such as metaboric acid and derivatives of boron oxide are widely used as catalysts for a variety of chemical reactions such as partial oxidation of paraffins or cycloparaffins with oxygen. According to such an oxidation process, the oxidation reaction mixture is hydrolyzed with water and the resulting mixture is separated into an organic phase and an aqueous phase. The oxidation end product is obtained from the organic phase while boric acid is recovered from the aqueous phase for reuse as catalyst.

In such processes, a waste liquid still containing boron compounds and organic compounds is produced. In a process for the production of cyclohexanol and cyclohexanone by the liquid phase oxidation of cyclohexane with oxygen in the presence of metaboric acid, for example, there is produced as a waste liquid a solution containing 2.5–10 wt % of boric acid and 15–60 wt % of organic compounds such as adipic acid. Because such waste liquid has a high COD value and is harmful to living beings, the disposal thereof causes environmental pollution.

Combustion is known to be one of the effective methods for the treatment of organic compouds-containing waste liquids. When a waste liquid containing boron compounds as well as organic compounds is treated by conventional combustion methods, however, various problems are found to arise due to the presence of the boron compounds. That is, by the combustion of the waste liquid, the boron compounds are converted into boron oxide which is present in the form of liquid particles in the resulting combustion gas. These particles tend to deposit on the walls of a combustion furnace and combustion gas passages, causing corrosion of the walls and clogging of the passages, whereby the discontinuace of the operation results.

STATEMENT OF OBJECTS

It is, accordingly, an object of the present invention to provide an effective process for the treatment of waste liquids which contain boron compounds and organic compounds especially waste liquid resulting from the oxidation of paraffins or cycloparaffins with oxygen in the presence of boron compounds.

Another object of the present invention is to provide a process which allows the recovery of boric acid from such waste liquids.

A further object of the present invention is to provide a process in which the waste liquids are combusted without forming boron oxide, thereby avoiding the above-mentioned problems of the prior art process.

It is yet a further object of this invention to provide a process which allows the recovery of the heat of the combustion gas.

BRIEF DESCRIPTION OF THE DRAWING

Other objects, features and advantages of the present invention will become apparent from the detailed description of the invention to follow, when considered in light of the accompanying drawing in which: the sole FIGURE is a schematic representation of a system for carrying out the process of the present invention.

DETAILED DESCRIPTION OF THE INVENTION

The present invention provides a process for the treatment of a waste liquid which contains boron compounds and organic compounds. The process includes combusting the waste liquid in a combustion zone, preferably a combustion furnace, at a temperature exceeding 1000° C. but not exceeding 1500° C. in the presence of steam of such an amount that boron components in the resulting combustion gas product can be present as metaboric acid.

The vapor pressure of liquid metaboric acid ($HBO_2$) is much higher than that of liquid boron oxide, and metaboric acid contained in a gas having a high partial pressure of steam is present substantially in the gaseous form. (When metaboric acid is present with high temperature steam, the partial pressure thereof is generally proportional to the square root of the partial pressure of the steam.) The metaboric acid contained in a low temperature gas having a partial pressure of the metaboric acid of, for example 45 mm Aq, is not condensed unless the temperature of the gas becomes 200° C. or below.

Metaboric acid is formed by the reaction of boron oxide with water:

$$\tfrac{1}{2}B_2O_3 + \tfrac{1}{2}H_2O \rightleftharpoons HBO_2 \qquad (1)$$

It has been found that when the waste liquid containing boron compounds and organic compounds is combusted at a temperature higher than 1000° C. in the presence of a large excess of steam, the above reaction (1) can favourably proceed. From the standpoint of chemical equilibrium, even when the combustion is effected at a temperature of not higher than 1000° C., the equilibrium of the above reaction (1) could shift to the right so long as sufficient steam is present. However, the reaction (1) cannot proceed in a satisfactory manner under such condition and boron oxide formed by the combustion is accumulated on the wall of the combustion furnace and the like. Presumably, when the combustion is carried out at a temperature not higher than 1000° C., boron oxide is initially produced in a large amount. Because of its low vapor pressure, the major part of the boron oxide thus produced exists in the form of fine liquid particles. The reaction of the boron oxide in such a state with water cannot proceed fast and, perhaps for this reason, the particles deposit and accumulate on the wall. On the other hand, the combustion at a temperature higher than 1000° C. can provide a condition which is favorable, from the standpoint of chemical equilibrium and chemical kinetics, to the formation of gaseous metaboric acid.

Thus, in the process of this invention, the waste liquid must be combusted at a temperature higher than 1000° C. For reasons of durability of the combustion furnace, 1500° C. is the upper limit of the combustion temperature. The combustion is preferably performed at a temperature between 1050° and 1450° C.

The amount of steam plays another important role in the process of this invention. The combustion should be conducted in the presence of steam in an amount sufficient for the equilibrium of the reaction (1) to smoothly shift to the right. The amount of the steam can be generally defined in terms of the ratio of steam to boron components contained in the combustion gas. In the process of this invention, the amount of steam is such that the ratio by mole of steam of boron components calculated as boron oxide ($H_2O/B_2O_3$ ratio) is at least 30, preferably at least 80. Since too high a $H_2O/B_2O_3$ ratio required excessive consumption of auxiliary fuels, a $H_2O/B_2O_3$ ratio of 700 is the preferable upper limit from the economic point of view.

In case where the waste liquid to be treated is low in water content, it is necessary to supply water in an aount so as to provide the necessary vapor pressure of steam in the combustion zone. This may be done by mixing the waste liquid with water or by feeding water or steam into the combustion zone separately with the waste liquid.

By the combustion treatment according to the process of this invention, substantially all (over 99%) the boron compounds contained in the waste liquid may be converted into metaboric acid in the gaseous form. When the content of the organic compounds in the waste liquid is too low or when the content of water in the waste liquid is too high to effect the combustion at over 1000° C., an auxiliary fuel is fed to the combustion zone for combustion.

The metaboric acid-containing combustion gas thus produced in the combustion zone is introduced into a heat recovery zone, preferably a boiler such as a waste heat boiler, where it is brought into indirect contact with a heatable fluid such as a heat transfer medium, preferably water, for indirect heat exchange therewith. In the heat recovery zone, the combustion gas is maintained at a temperature higher than the condensation point (dew point) of the metaboric acid so that the metaboric acid can be present in the gaseous form. Generally, the temperature of the combustion gas in the outlet of the heat recovery zone is controlled at least 400° C. Thus, the recovery of the heat can be conducted while eliminating problems of blockage of pipes and lowering of the heat transfer coefficient of the heat exchange system.

The combustion gas whose heat has been transferred to the heatable fluid in the heat recovery zone is then introduced into a contact zone, preferably a submerged combustion vessel, where the gas is brought into direct contact with water. By this, the metaboric acid in the gas can dissolve into the water and can be converted into boric acid (orthoboric acid). A portion of the liquid in the cntact zone is continuously withdrawn for the recovery of the boric acid.

By the foregoing treatment, boron compounds contained in the waste liquid can be recovered as an aqueous solution of boric acid at a recovery rate of 95% or more. The process of the present invention may be applied to the treatment of various liquid wastes containing boron compounds and organic compounds. Especially, the process is very effective in treating waste liquids resulting from alcohol production processes in which paraffins, cycloparaffins or their derivatives are subjected to liquid phase oxidation in the presence of boron compounds such as metaboric acid. Such liquid wastes generally contains 15-60 wt % of organic compounds and 2.5-10 wt % of boron compounds.

In the process of the present invention, the boron components contained in the combustion gas can be present as gaseous metaboric acid in the combustion zone and heat recovery zone. Therefore, corrosion of the wall of the furnace and pipes and clogging of the pipes due to the deposition of boron oxide are satisfactorily prevented, ensuring stable operation of the process for a long period of time. Additionally, pollutive waste liquid is effectively treated while allowing efficient recovery of valuable boric acid and heat.

The preferred embodiment of this invention will be described below with reference to the accompanying drawing.

A liquid waste composed of 51.0 wt % of organic compounds (calorific value: 5000 Kcal/Kg) and 45.9 wt % of water and 3.1 wt % of boric acid (calculated as metaboric acid) is subjected to a continuous combustion treatment according to the present invention using the apparatus as shown in the accompanying drawing.

The liquid waste is continuously fed through a line 1 and a burner 2 into a combustion furnace 4 at a rate of 980 Kg/hour for combustion thereof. The combustion is effected at about 1350° C. using 3300 $Nm^3$/hour of air supplied from a line 3 without using any auxiliary fuel. The partial pressure of steam in the combustion gas in the furnace 4 shows about 2500 mmAq while that of metaboric acid about 28 mmAq. That is, the $H_2O/B_2O_3$ ratio is 179 mol/mol. Almost no boron oxide is present in the combustion gas and substantially all the boric acid fed to the furance 4 is converted into metaboric acid. The condensation point of the metaboric acid contained in the combustion gas is below 200° C.

The combustion gas is then introduced into a boiler 5, in which about 2000 Kg/hour of steam having a pressure of 45 $Kg/cm^2$ and a temperature of about 256° C. is obtained, while the combustion gas is cooled to 400° C. by indirect heat exchange with the boiler water.

The cooled combustion gas is then introduced into a contacting vessel 8 through a duct 6 and a downcommer tube 7, to blow the gas into the liquid in the vessel 7. As a result, the metaboric acid in the gas is absorbed in the water in the vessel and is converted into boric acid. Since the combustion gas is occasionally cooled to a temperature below the condensation point of the metaboric acid during its passage through the downcommer tube 7, a portion of the liquid in the vessel 8 is continuously fed to the upper portion of the tube 7 by means of a pump 9 to wash the interior surface thereof and returned to the vessel 8. Another portion of the liquid in the vessel 8 is continuously withdrawn therefrom through a pipe 10 at a rate of 250 Kg/hour to recover boric acid as about 12% aqueous solution.

A vapor laden gas emitted from the vessel 8 has a temperature of 70° C. The gas is introduced into an adsorption tower 11 where it is contacted with washing water fed from a line 12. Thereby, a trace amount of boric acid mist and boric acid vapor contained in the gas coming from the vessel 8 is absorbed in the washing water. The purified gas is then discharged into the air through a line 14. A portion of the water collected in the bottom of the washing tower 11 is fed through a line 13 into the vessel 8 to maintain the amount of the liquid in the vessel 8 constant.

What is claimed is:

1. A process for the treating of a waste liquid containing boron compounds and organic compounds, comprising:
    combusting the waste liquid in a combustion zone at a temperature exceeding 1000° C. but not exceeding 1500° C. in the presence of steam to produce a combustion gas, said steam being present in an amount providing a molar ratio of steam to boron components calculated as boron oxide of at least 30:1, to thereby shift to the right the following reaction:

$$\tfrac{1}{2}B_2O_3 + \tfrac{1}{2}H_2O \rightleftharpoons HBO_2$$

in said combustion zone, and so that substantially all boron components contained in said combustion gas are present as gaseous metaboric acid;

introducing said combustion gas into a heat recovery zone to cool said combustion gas by indirect heat exchange with a heatable fluid so that said combustion gas is not cooled to a temperature below 400° C.; introducing said cooled combustion gas into a contact zone to bring said cooled combustion gas into direct contact with water, whereby the metaboric acid is converted into boric acid; and withdrawing a portion of the liquid in said contact zone to recover boric acid.

2. A process as claimed in claim 1, further comprising withdrawing a vapor laden gas from said contact zone, and introducing same into an adsorption zone to purify same by washing with washing water.

3. A process as claimed in claim 2, further comprising introducing the washing water after contact with said vapor laden gas into said contact zone.

4. A process as claimed in claim 1, wherein the waste liquid is an aqueous waste resulting from the oxidation of cyclohexane with oxygen in the presence of a boron compound.

5. The process of claim 1 wherein said combustion zone temperature is within the range of 1050° to 1450° C.

6. The process of claim 1 or 5 wherein said combusting is conducted in the presence of an amount of steam providing a molar ratio of steam to boron components calculated as boron oxide of 80:1 to 700:1.

* * * * *